| United States Patent [19] | [11] | 4,076,923 |
|---|---|---|
| Matsuura et al. | [45] | Feb. 28, 1978 |

[54] PROCESS FOR PREPARING POLYOLEFINS

[75] Inventors: Kazuo Matsuura, Kawasaki; Masaomi Matsuzaki, Yokohama; Fumiaki Oshimi, Kawasaki; Nobuyuki Kuroda, Yokohama; Mituji Miyoshi, Kanagawa, all of Japan

[73] Assignee: Nippon Oil Company, Limited, Tokyo, Japan

[21] Appl. No.: 669,299

[22] Filed: Mar. 22, 1976

[30] Foreign Application Priority Data

Apr. 3, 1975 Japan .................................. 50-39745

[51] Int. Cl.² ........................... C08F 4/02; C08F 10/02
[52] U.S. Cl. .................................. 526/97; 252/429 C; 252/430; 526/121; 526/124; 526/129; 526/138; 526/156; 526/352

[58] Field of Search .................. 526/97, 121, 124, 129, 526/156, 138

[56] References Cited

FOREIGN PATENT DOCUMENTS 2,015,592  12/1970  Germany.

*Primary Examiner*—Edward J. Smith

[57] ABSTRACT

According to the present invention, there is provided a process for preparing polyolefins which comprises polymerizing or copolymerizing olefins using as catalyst a component consisting of a solid carrier and a titanium compound and/or a vanadium compound supported thereon, and an organometallic compound, said solid carrier consisting of a product obtained by mixing and heating an aluminum oxide and an ammonium sulfate.

8 Claims, No Drawings

PROCESS FOR PREPARING POLYOLEFINS

BACKGROUND OF THE INVENTION

1. Field of the Invention

This invention relates to a process for preparing polyolefins using a novel polymerization catalyst. More particularly, it is concerned with a process for preparing polyolefins which comprises polymerizing or copolymerizing olefins using a catalyst, said catalyst being prepared by mixing and heating an aluminum oxide and an ammonium sulfate, supporting a titanium compound and/or a vanadium compound, which are each a component of a Ziegler catalyst, on the resulting product as carrier and thereafter activating the resulting mixture with an organometallic compound.

2. Description of the Prior Art

In the technical field of this sort there have heretofore been known catalysts consisting of various inorganic solids as carrier and compounds of transition metals such as titanium and vanadium supported thereon. Typical of such inorganic carrier are mentioned alumina, titanium dioxide, zirconia, silica, thoria and magnesia (see, for example, Japanese Patent Publication No. 25353/69).

However, catalysts prepared by using the above-mentioned carriers, then supporting thereon a transition metal compound(s) such as titanium compound and/or a vanadium compound which are each a component of a Ziegler catalyst and thereafter activating with an organometallic compound, are disadvantageous in that the activity of those catalysts is generally low. Among the above-mentioned carriers, magnesia is known to give a relatively high activity, but alumina and silica have only afforded extremely low activity catalysts.

On the other hand, in the production of polyolefins, the polymerization activity is desired to be as high as possible. If the polymerization activity is high, it is not only possible to reduce the cost of catalyst, but also to prepare polyolefins in high yield at low partial pressure of monomer and in a short period of time; in addition, the procedure of catalyst removal which is usually required becomes simplified or, in some cases, may be omitted, with only a small amount of ash remained in the resulting polymer and the polymer being fully fit for practical use; and thus the process becomes extremely simplified as a whole. From this point of view, many of the catalyst systems using the above-mentioned inorganic carriers as they are have a low activity and thus improvements have been considered necessary.

SUMMARY OF THE INVENTION

Having made a keen study on such catalysts with carrier, we have found a process for preparing a novel catalyst for olefin polymerization and a process for polymerizing olefins using such catalyst.

To be more specific, the present invention relates to a process for polymerizing or copolymerizing olefins using a catalyst, which catalyst is obtained by mixing and heating an aluminum oxide and an ammonium sulfate, supporting a titanium compound and/or a vanadium compound on the resulting product as carrier and thereafter activating the resulting mixture with an organometallic compound. By using the process of the present invention, there is attained an extremely high polymerization activity, that is, the foregoing merits based on the improvement in polymerization activity are satisfied and, above all, the polymerization activity becomes high enough to render the catalyst removing procedure unnecessary, which is specially characteristic. Thus, the process of the present invention, which has heretofore not been known at all, could produce an extremely high activity catalyst. This is completely beyond anticipation and cannot help being considered to be a surprising fact.

DESCRIPTION OF THE INVENTION

The characteristic features of the present invention will become clear from the following descriptions.

The aluminum oxide employed in the present invention is either alumina or a double oxide of aluminum and at least one other metal from Groups I-VIII of the Periodic Table.

As alumina there may be employed various aluminas, for example, one obtained by thermal decomposition of aluminum alkoxide and one obtained by calcining a well-known carystalline or non-crystalline hydrated alumina. The condition for the calcination can be widely selected in the known range, but, for example, the calcination at a temperature in the range of from about 200° to 1,000° C. is desirable. The physical properties of alumina which usually become an issue such as particle size, surface area and pore volume can of course be changed, depending on the method of preparing alumina. To select appropriate values of such physical properties of alumina according to various objects is readily performable to those skilled in the art. Of course, aluminas employed in the present invention may contain inorganic compounds of other metals such as Na, Ca, Mg, Si, and Fe.

As typical double oxides of aluminum and at least one other metal from Groups I-VIII of the Periodic Table are mentioned natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$ and $Al_2O_3 \cdot NiO$. These formulae are not molecular formulae but represent only composition. The structure and composition ratio of the double oxides employed in the present invention are not specially restricted. In the present invention, these aluminum oxides may be used alone or in combination of two or more. It goes without saying that the above-mentioned aluminum oxides may contain a small amount of water and that calcined ones may also be employed without any trouble.

Although the method of preparing the carrier used in the invention by mixing and heating an aluminum oxide and an ammonium sulfate is not specially restricted, it is usually convenient to mix the two in a solid state and thereafter heat the resulting mixture. The heating temperature is not specially restricted, but it is desirable that the heating be applied at a temperature in the range of from preferably 50° to 1,000° C. and more preferably from 200° to 800° C. for about one minute to 50 hours, preferably 2 to 30 hours. The amount of ammonium sulfate to be mixed with aluminum oxide can be widely selected, but usually 3-300 grams of ammonium sulfate per 100 grams of aluminum oxide is used. It is desirable to effect the mixing and heating treatment so that the product obtained after heat treatment will contain 0.5 to 20 wt.%, preferably 1 to 15 wt.%, of sulfur. The structure of the product obtained by mixing and heating an aluminum oxide and an ammonium sulfate in the present invention is not clear. However, since a substantial amount of sulfur atoms are detected in the product, it is presumed that a new carrier is formed. Thus, if an aluminum oxide and an ammonium sulfate are mixed and heated and the resulting product is used as carrier, there can be obtained an extremely high-activity catalyst. This is completely beyond anticipation and cannot help being considered to be a surprising fact.

As the method of supporting a titanium compound and/or a vanadium compound on the carrier prepared as above, well-known methods may be used. For example, the above-prepared carrier may be contacted with a transition metal compound under heating in the presence or absence of an inert solvent. Preferably, the two are heated at 50°-300° C., more preferably 100°-150° C., in the absence of solvent. The reaction time is not specially restricted, but usually 5 minutes or more. A long contact time, for example, 5 minutes to 10 hours, may be adopted though it is not necessary. As another supporting method, the two components may be contacted in a mechanical manner, for example, by means of ball milling. This treatment, of course, should be carried out in an oxygen-and moisture- free inert gas atmosphere. The amount of a transition metal compound used in the present invention may be an excess amount, but usually the compound may be used in an amount corresponding to 0.001 to 50 times the weight of the above-mentioned carrier. Preferably, an excess transition metal halide is removed by washing with solvent after the mixing and heating treatment. The method of removing unreacted transition metal compound after completion of the reaction is not specially restricted. The method usually conducted involves several-time washing with a solvent which is inert against Ziegler catalysts and evaporating the washing under reduced pressure to give solid powders.

The olefin polymerication reaction using the catalyst of the present invention is carried out in the same manner as the ordinary olefin polymerization reaction using Ziegler catalysts. That is, a substantially oxygen- and water-free condition is applied throughout the reaction. The conditions for olefin polymerization involve temperatures ranging from 20° to 300° C., preferably from 50° to 180° C., and pressures ranging from normal to 70 kg/cm$^2$, preferably from 2 to 60 kg/cm$^2$. Molecular weight is adjustable to a certain extent by changing the polymerization conditions such as the polymerization temperature and the mole ratio of catalyst, but it is more effectively adjusted by adding hydrogen into the polymerization system. With the catalyst of the present invention, two or more stage polymerization reactions having different polymerization conditions such as different hydrogen concentrations and polymerization temperatures can of course be made without any trouble.

The process of the present invention can be applied to the polymerization of all the olefins that are polymerizable with Ziegler catalysts. For example, it is suitably applied to the homopolymerization of α-olefins such as ethylene, propylene and 1-butene and to the copolymerization of ethylene and propylene, ethylene and 1-butene, and propylene and 1-butene. The transition metal compounds used in the present invention are titanium or vanadium compounds. Illustrative are tetravalent titanium compounds such as titanium tetrachloride, titanium tetrabromide, ethoxytitanium trichloride, diethoxytitanium dichloride, dibutoxytitanium dichloride, phenoxytitanium trichloride, and tetra-n-butoxytitanium; trivalent titanium compound such as titanium trichloride, and titanium trichloride-aluminum trichloride complex; tetravalent vanadium compound such as vanadium tetrachloride; pentavalent vanadium compound such as hydroxyvanadium trichloride and orthoalkyl vanadate; and trivalent vanadium compound such as vanadium trichloride.

As the organometallic compounds used in the present invention, organic compounds of metals from Groups I-IV of the Periodic Table which are known as a component of a Ziegler catalyst may be employed, among which organoaluminum, organomagnesium and organozinc compounds are specially preferable. Illustrative are organoaluminum compounds of the general formulae, $R_3Al$, $R_2AlX$, $RAlX_2$, $R_2AlOR$, $RAl(OR)X$ and $R_3Al_2X_3$ wherein R is alkyl or aryl and X is halogen, such as triethylaluminum, triisobutylaluminum, trioctylaluminum, diethylaluminum chloride, and ethylaluminum sesquichloride; organozinc compounds of the general formula $R_2Zn$ wherein R is alkyl, such as diethylzinc; and, as organomagnesium compounds, the so-called Grignard's reagents such as ethylmagnesium bromide, butylmagnesium chloride, and phenylmagnesium chloride, as well as diethylmagnesium, butylmagnesium, and diphenylmagnesium; and ether complexes and mixtures thereof. Although the amount of these organometallic compounds used in the present invention is not specially restricted, 0.1 to 1,000 moles per mole of the transition metal halide may usually be employed.

DESCRIPTION OF THE PREFERRED EMBODIMENTS

Examples of the present invention are given below, but it is to be understood that these Examples are for purpose of illustration only and not intended as a definition of limits of the invention.

EXAMPLE 1

Preparation of a Catalyst 10 g. of alumina, which had been prepared by calcining a commercially available alumina monohydrate ("Ketjen B") in nitrogen atmosphere at 700° C. for 16 hours, and 6.6 g. of ammonium sulfate were mixed together. The resulting mixture was calcined in nitrogen atmosphere at 500° C. for 20 hours to form a carrier, which contained 8.9 wt.% of sulfur atoms. 5 g. of the carrier was transferred into a flask equipped with a stirrer, into which was then added 80 ml. of titanium tetrachloride. Heating was then applied at 150° C. for 2 hours. The reaction product was washed with hexane; the washing operation was repeated until titanium tetrachloride was no longer perceptible in the washing. The solid portion was subjectd to drying and then analysis to find that 26.5 mg. of titanium per g. of the solid was supported.

Polymerization

A 2 liter stainless steel autoclave equipped with an induction stirrer was purged with nitrogen, in which were then added 1,000 ml. of hexane, 5 millimoles of triethylaluminum and 301 mg. of the above-mentioned solid. The temperature was raised to 90° C. while stirring was applied. The system, whose pressure became 2 kg/cm$^2$ due to the vapor pressure of hexane and nitrogen, was pressurized with hydrogen to a total pressure of 6 kg/cm$^2$ and then with ethylene to a total pressure of 10 kg/cm$^2$, and thus the polymerization was initiated. While ethylene was continuously introduced to maintain the total pressure at 10 kg/cm$^2$, the polymerization was continued for one hour. Thereafter, the polymer slurry was transferred into a beaker and hexane was removed under reduced pressure to give 96 g. of a white polyethylene with a melt index of 0.010. The catalyst activity, which was 80 g. polyethylene/g. solid·hr.·$C_2H_4$ pressure, 3,020 g. polyethylene/g. Ti·hr.·$C_2H_4$ pressure, was remarkably improved in both activity per solid and that per titanium as compared with that in Comparative Example 1 in which the ammonium sulfate mixing and heating treatment was not applied to the alumina.

COMPARATIVE EXAMPLE 1

A catalyst was prepared in the same manner as in Example 1 except that the ammonium sulfate mixing and heating treatment was not applied to the alumina. The catalyst thus prepared contained 16.4 mg. of titanium per g. of the solid. A polymerization was conducted for one hour in the same procedure as in Example 1 except that 392 mg. of the said catalyst was used, to give 50 g. of a white polyethylene with a melt index of 0.04. The catalyst activity, which was 32 g. polyethylene/g. solid·hr.·$C_2H_4$ pressure, 1,950 g. polyethylene/g. Ti·hr.·$C_2H_4$ pressure, was obviously inferior to that in Example 1 in which the ammonium sulfate mixing and heating treatment was applied to the alumina.

EXAMPLE 2

A carrier was prepared in the same manner as in Example 1 except that 10 g., in place of 6.6 g., of ammonium sulfate was used and that the mixture of alumina and ammonium sulfate was heated at 600° C. for 10 hours. Using 5 g. of the carrier thus prepared, 80 ml. of titanium tetrachloride was supported in the same way as in Example 1 to give a catalyst in which 25.0 mg. of titanium per g. of the solid was supported. A polymerization was conducted for one hour in the same procedure as in Example 1 except that 286 mg. of the said catalyst was used, to yield 79 g. of a white polyethylene with a melt index of 0.012. The catalyst activity, which was 69 g. polyethylene/g. solid·hr.·$C_2H_4$ pressure, 2,760 g. polyethylene/g. Ti·hr.·$C_2H_4$ pressure, was much higher than that in Comparative Example 1.

EXAMPLE 3

A carrier (containing 8.7 wt.% of sulfur) and a catalyst were prepared in the same manner as in Example 1 except that AF hydrated alumina manufactured by Shokubai Kasei Co. (boehmite; surface area, approx. 380 m²/g.) was calcined at 650° C. for 2 hours and the resulting alumina was used. The catalyst thus prepared contained 25.1 mg. of titanium per g. of the solid. A polymerization was conducted in the same procedure as in Example 1 except that 510 mg. of the said catalyst was used to give 75 g. of a white polyethylene with a melt index of 0.63 (determined under a load of 21.6 kg.). The catalyst activity was 37 g. polyethylene/g. solid·hr.·$C_2H_4$ pressure, 1,470 g. polyethylene/g. Ti·hr.·$C_2H_4$ pressure. It is seen that although AF hydrated alumina only affords a low activity catalyst (see Comparative Example 2), it can afford a high activity catalyst if the process of the present invention is used.

COMPARATIVE EXAMPLE 2

A catalyst was prepared in the same manner as in Example 3 except that the ammonium sulfate mixing and heating treatment was not applied to the alumina. A polymerization was conducted in the same procedure as in Example 1 except that 653 mg. of the said catalyst was used, to give 37 g. of a white polyethylene with a melt index of 0.012. The catalyst activity, which was 14 g. polyethylene/g. solid·hr.·$C_2H_4$ pressure, 980 g. polyethylene/g. Ti·hr.·$C_2H_4$ pressure, was far lower than that in Example 3.

EXAMPLE 4

A carrier (containing 10.4 wt.% of sulfur) and a catalyst were prepared in the same manner as in Example 3 except that 10 g., in place of 6.6 g., of ammonium sulfate was used and that the 20-hour heat treatment was made at 600° C. instead of 500° C. The catalyst thus prepared contained 24.9 mg. of titanium per g. of the solid. A polymerization was conducted for one hour in the same procedure as in Example 1 except that 405 mg. of the said catalyst was used to give 54 g. of a white polyethylene with a melt index of 0.48 (determined under a load of 21.6 kg.). The catalyst activity, which was 33 g. polyethylene/g. solid·hr.·$C_2H_4$ pressure, 1,320 g. polyethylene/g. Ti·hr.·$C_2H_4$ pressure, was much high than that in Comparative Example 2.

EXAMPLE 5

A polymerization was conducted for one hour in the same procedure as in Example 1 except that 530 g. of the catalyst prepared in Example 3 was used and that 5 millimoles of diethylaluminum monochloride was used in place of tiethylaluminum, to give 57 g. of a white polyethylene with a melt index of 0.51 (determined under a load of 21.6 kg.). The catalyst activity, which was 27 g. polyethylene/g. solid·hr.·$C_2H_4$ pressure, 1,070 g. polyethylene/g. Ti·hr.·$C_2H_4$ pressure, was obviously improved as compared with that in Comparative Example 3 in which the ammonium sulfate mixing and heating treatment was not applied.

COMPARATIVE EXAMPLE 3

A polymerization was conducted for one hour in the same procedure as in Comparative Example 2 except that 590 mg. of the catalyst prepared in Comparative Example 2 was used and that 5 millimoles of diethylaluminum monochloride was employed in place of triethylaluminum, to give 24 g. of a white polyethylene with a melt index of 0.010. The catalyst activity, which was 10 g. polyethylene/g. solid·hr.·$C_2H_4$ pressure, 700 g. polyethylene/g. Ti·hr.·$C_2H_4$ pressure, was obviously inferior to that in Example 5 in which the ammonium sulfate mixing and heating treatment was applied.

EXAMPLE 6

Using 320 mg. of the catalyst prepared in Example 1 and in the same procedure as in Example 1, hexane, triethylaluminum, the solid catalyst and hydrogen were placed in the autoclave, in which was then introduced a mixed ethylene-propylene gas containing 2 mole % of propylene at 90° C. so as to maintain the pressure in the autoclave at 10 kg/cm². Under such condition a polymerization was carried out for one hour to give 73 g. of an ethylene-propylene copolymer with a melt index of 0.011. The catalyst activity was 57 g. polyethylene/g. solid·hr.·$C_2H_4$ pressure, 2,140 g. polyethylene/g. Ti·hr.·$C_2H_4$ pressure.

EXAMPLE 7

A catalyst was prepared in the same way as in Example 1 except that trichloromonobutoxy titanium was used in place of titanium tetrachloride. A polymerization was carried out for one hour in the same procedure as in Example 1 except that 315 mg. of the said catalyst was employed, to yield 91 g. of a white polyethylene with a melt index of 0.012. The catalyst activity was 72 g. polyethylene/g. solid·hr.·$C_2H_4$ pressure, 2,760 g. polyethylene/g. Ti·hr.·$C_2H_4$ pressure.

EXAMPLE 8

A carrier (containing 8.5 wt.% of sulfur) and a catalyst were prepared in the same way as in Example 1 except that silica·alumina (obtained by calcining a commercially available Ketjen AS at 700° C. for 6 hours) was used in place of the alumina. The catalyst thus prepared contained 26.1 mg. of titanium per g. of the solid. A polymerization was carried out for one hour in the same procedure as in Example 1 except that 382 mg. of the said catalyst was employed to yield 58 g. of a white polyethylene with a melt index of 0.010. The catalyst activity, which was 38 g. polyethylene/g. solid·hr.·$C_2H_4$ pressure, 1,450 g. polyethylene/g. Ti·hr.·$C_2H_4$ pressure, was remarkably improved as compared with that in Comparative Example 4 in which the ammonium sulfate mixing and heating treatment was not applied to the silica·alumina.

COMPARATIVE EXAMPLE 4

A catalyst was prepared in the same way as in Example 8 except that the ammonium sulate mixing and heating treatment was not applied to the silica·alumina. A polymerization was carried out for one hour in the same procedure as in Example 1 except that 447 mg. of the said catalyst was used, to yield 36 g. of a white polyethylene with a melt index of 0.042. The catalyst activity, which was 20 g. polyethylene/g. solid·hr.·$C_2H_4$ pressure, 910 g. polyethylene/g. Ti·hr.·$C_2H_4$ pressure, was obviously inferior to that in Example 8 in which the ammonium sulfate mixing and heating treatment was applied to the silica·alumina.

EXAMPLE 9

A polymerization was carried out in the same procedure as in Example 8 except that 5 millimoles of tridecylaluminum was used in place of triethylaluminum and that the amount of the catalyst used was 266 mg., to yield 110 g. of a white polyethylene with a melt index of 0.009. The catalyst activity was 103 g. polyethylene/g. solid·hr.·$C_2H_4$ pressure, 3,940 g. polyethylene/g. Ti·hr.·$C_2H_4$ pressure.

EXAMPLE 10

A carrier and a catalyst were prepared in the same was as in Example 1 except that a commercially available hydrotalcite (manufactured by Kyowa Kagaku Co.; Mg/Al atomic ratio=3/1) which had been calcined at 700° C. for 16 hours was used.

A polymerization was carried out for one hour in the same procedure as in Example 1 except that 505 mg. of the said catalyst was employed, to yield 135 g. of a white polyethylene with a melt index of 0.08. The catalyst activity, which was 67 g. polyethylene/g. solid·hr.·$C_2H_4$ pressure, 3,350 g. polyethylene/g. Ti·hr.·$C_2H_4$ pressure, was remarkably improved as compared with that in Comparative Example 5 in which the ammonium sulfate mixing and heating treatment was not applied.

COMPARATIVE EXAMPLE 5

A catalyst was prepared in the same way as in Example 10 except that the ammonium sulfate mixing and heating treatment was not applied to the calcined hydrotalcite.

A polymerization was carried out for one hour in the same procedure as in Example 1 except that 523 mg. of the said catalyst was employed, to yield 90 g. of a white polyethylene with a melt index of 0.15. The catalyst activity, which was 43 g. polyethylene/g. solid·hr.·$C_2H_4$ pressure, 2,130 g. polyethylene/g. Ti·hr.·$C_2H_4$ pressure, was obviously inferior to that in Example 10 in which the ammonium sulfate mixing and heating treatment was applied.

We claim:

1. A process for preparing polyolefins which comprises polymerizing or copolymerizing olefins using as catalyst a component comprising a solid carrier and a titanium compound and/or a vanadium compound supported thereon, and an organometallic compound of a metal of Groups I to IV of the Periodic Table, said solid carrier containing 0.5 to 20% by weight of sulfur and being prepared by mixing and heating aluminum oxide and ammonium sulfate at a temperature of from 50° to 1,000° C.

2. The process according to claim 1 in which said aluminum oxide is either alumina or a double oxide of aluminum and at least one other metal from Groups I-VIII of the Periodic Table.

3. The process according to claim 1 in which said solid carrier is prepared by heating the aluminum oxide and ammonium sulfate at a temperature of from 200° to 800° C for one minute to 50 hours.

4. The process according to claim 1 in which said solid carrier contains 1 to 15 weight percent sulfur.

5. The process according to claim 1 in which said polymerization or copolymerization of olefin is carried out at a temperature in the range of from 20° to 300° C. and at a pressure in the range of from atmospheric to 70 kg/$cm^2$.

6. The process according to claim 1 in which said polymerization or copolymerization of olefin is carried out while hydrogen is added into the polymerization system.

7. The process according to claim 1 in which said organometallic compound is selected from the group consisting of organoaluminum compound and organozinc compound.

8. The process according to claim 1 in which said olefin is selected from the group consisting of ethylene, propylene and 1-butene.

* * * * *